United States Patent Office 3,267,069
Patented August 16, 1966

3,267,069
STABILIZED ABS POLYMERS CONTAINING ZINC SULFIDE AND A DIALKYL THIODIPROPIONATE
William Cummings, Woodbury, Conn., assignor to United States Rubber Company, New York, N.Y., a corporation of New Jersey
No Drawing. Filed Oct. 31, 1962, Ser. No. 234,522
9 Claims. (Cl. 260—45.75)

This invention relates to novel stabilized plastic polymeric compositions and to a method for preparing such compositions. More particularly, this invention relates to the stabilization of either an ABS polymer or a styrene-acrylonitrile copolymer resin with a mixture of zinc sulfide and an ester of $\beta,\beta'$-thiodipropionic acid.

The thermoplastic materials to which the present invention pertains are selected from the group consisting of styrene-acrylonitrile copolymer resins and the so called "gum plastics," such as are obtained by grafting resin-forming monomers, e.g., styrene, acrylonitrile, or the like, onto rubbers such as polybutadiene, butadiene-styrene copolymer, or the like, or by mixing a resin, e.g., styrene-acrylonitrile resin, and a rubber, e.g., butadiene-acrylonitrile rubber. Such gum plastics are commonly referred to as "ABS plastics," meaning that they are comprised of acrylonitrile, butadiene, and styrene.

Both ABS plastics and styrene-acrylonitrile plastics have received considerable attention of late and have been widely used. Heretofore, however, such plastics have exhibited a tendency to discolor when subjected to a temperature sufficiently high to flux the plastic, and this has been so even when a conventional antioxidant or mixture of antioxidants has been present. Particularly severe discolorations have occurred when the plastic has been subjected to a temperature in excess of about 300° F. in the presence of air. Moreover, with prolonged exposure under such conditions, there will occur, in addition to discoloration, a degradation of the physical properties of the plastic. In the fabrication of various products from such plastics it has been necessary to heat the material above its fluxing point in order to form it. However, such heating invariably results in objectionable discoloration, even when pigments are added to the composition to mask the discoloration.

Accordingly, it is an object of this invention to provide a novel method for stabilizing ABS plastic and/or styrene-acrylonitrile plastic compositions.

Another object is to provide a method for stabilizing such plastic compositions whereby such compositions will not discolor when subjected to elevated temperatures in the presence of air.

A further object is to provide novel stabilized plastic compositions.

Additional objects will become apparent hereinafter.

In accordance with one aspect of my invention, I have found that a plastic composition selected from the group consisting of ABS polymer and styrene-acrylonitrile copolymer can be effectively stabilized against discoloration and degradation of physical properties from elevated temperature aging. Such stabilization is effected by incorporating into the plastic a small but effective amount of a mixture of zinc sulfide and an ester of $\beta,\beta'$-thiodipropionic acid. Suitable thiodipropionate esters which may be employed in the stabilizing mixture of my invention may be represented by the following formula:

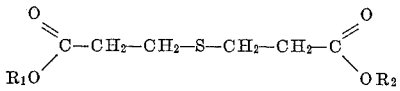

wherein $R_1$ and $R_2$ are alkyl groups or substituted alkyl groups and wherein the sum of the total number of carbon atoms in $R_1$ and $R_2$ is at least sixteen. Thus, the thiodipropionate ester must have a sufficiently high molecular weight to be essentially non-volatile at the temperatures employed, and such non-volatility is obtained when the total number of carbon atoms in $R_1$ and $R_2$ is at least sixteen. It is generally preferred that the total number of carbon atoms in $R_1$ and $R_2$ be from about 16 to 40, although a number in excess of 40 may be employed, but is generally impractical.

The thiodipropionate ester may be prepared in conventional manner by esterifying $\beta,\beta'$-thiodipropionic acid with an alcohol. The alcohol or alcohols used may be either primary, secondary, or tertiary alcohols. However, I prefer to use a primary and/or secondary alcohol since tertiary alcohols will esterify somewhat reluctantly.

The alkyl group making up $R_1$ and $R_2$ may be either a straight chain or branched chain and may contain substituents such as cycloaliphatic and/or aromatic groups, e.g., phenyl 1-naphthyl, 2-naphthyl, and the like, provided that such cycloaliphatic or aromatic group is removed by at least two carbon atoms from the carbinol carbon. Particularly preferred thiodipropionate esters are the dilauryl, distearyl, and di(tridecyl) esters of $\beta,\beta'$-thiodipropionic acid.

As previously pointed out, where the plastic to be stabilized is an ABS polymeric material it will contain acrylonitrile, butadiene and styrene. Such ABS polymeric material will generally contain, by weight, from about 15 to 35% acrylonitrile, about 5 to 35% butadiene, and about 40 to 80% styrene, based on the entire ABS polymer as 100%.

The ABS polymer may be what is known as a graft copolymer, which may be prepared in accordance with known practice by polymerizing acrylonitrile monomer and styrene monomer in a previously prepared polybutadiene latex (or butadiene copolymer rubber latex), under such conditions that an appreciable portion of the acrylonitrile and styrene become "grafted," or polymerized directly on, the polybutadiene molecules, to make a new polymeric material which is commonly referred to as an ABS polymer. The butadiene portion (sometimes called the "base" or "spine") of the ABS graft polymer molecule is rubbery while the acrylonitrile-styrene (the grafted comonomers) portion of the graft polymer molecule is resinous. In practice, it is frequently desirable to add to such graft copolymer an additional quantity of separately prepared resin, e.g., styrene-acrylonitrile resin, with or without additional separately prepared butadiene-acrylonitrile copolymer rubber. A convenient way of blending these various polymeric materials is to blend or mix them in latex form, and thereafter coprecipitate or coagulate them to yield the desired mixture. However, the polymeric material may also be blended in solid form if desired.

In place of some or all of the graft copolymer, one may employ, as the ABS polymer, a physical blend (as distinguished from a chemically united graft copolymer) of separately prepared acrylonitrile-styrene resin and butadiene-acrylonitrile rubber, in such proportions as to yield the desired overall percentages of acrylonitrile, butadiene, and styrene previously specified.

Typical of the graft copolymers referred to previously are those described in U.S. Patent No. 2,820,773 to Childers et al., which issued January 2, 1958. Typical of gum plastics in the form of actual physical blends of rubber and resin are those described in U.S. Patents 2,439,202 to Daly, which issued April 6, 1948, and 2,600,024 to Romeyn et al., which issued June 10, 1952.

When the plastic to be stabilized is a resinous copolymer of acrylonitrile and styrene, the amount, by weight, of acrylonitrile is generally from about 5 to 65 percent, with the amount of styrene being correspondingly from about 95 to 35 percent. A more preferred range is from about 25 to 35 percent acrylonitrile and correspondingly from about 75 to 65 percent styrene.

The resinous styrene-acrylonitrile copolymer may be prepared by any of the well known conventional techniques, e.g., emulsion polymerization, solution polymerization, mass polymerization, or the like.

As previously noted, my invention involves adding to (1) a styrene-acrylonitrile copolymer plastic or (2) an ABS polymer plastic, i.e., a graft copolymer of styrene and acrylanitrile onto polybutadiene rubber (with or without mixing therewith a separately prepared resinous material such as a copolymer of styrene and acrylonitrile), or a physical blend of a resin such as styrene-acrylonitrile resin and a rubber such as butadiene-acrylonitrile rubber, a small but effective amount of a stabilizing mixture of zinc sulfide and a $\beta,\beta'$-thiodipropionate of the formula:

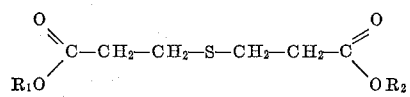

wherein $R_1$ and $R_2$ are selected from the group consisting of alkyl and substituted alkyl, and wherein the sum of carbon atoms in $R_1$ and $R_2$ is at least sixteen.

The amount by weight of stabilizing mixture to be incorporated into the plastic composition in order to effectively stabilize the same may be as little as about 0.01 part per 100 parts of plastic. There is no actual upper limit as to the amount of stabilizing mixture to be incorporated, although at relatively high levels the zinc sulfide may lead to undesired pigmentation and the thiodipropionate may exert an appreciable plasticizing action. Thus, stabilizing action is not appreciably improved when the amount of stabilizing mixture is above about 1.5 parts per 100 parts of plastic composition. A preferred range is from about 0.05 to 0.80 part of stabilizing mixture per 100 parts of plastic.

I have also found that best results as regards stabilizing efficacy are obtained when the weight ratio of the thiodipropionate ester to the zinc sulfide is from about 0.25 to 1.25. A more preferred range is from about 0.5 to 0.8.

The stabilizing mixture of my invention is desirably added to the plastic during the compounding operations, e.g., milling, Banbury mixing, extruding, or the like. Of course, other desired appropriate ingredients, e.g., pigments, fillers, and the like, may be included in the composition in conventional manner.

In accordance with another aspect of my invention, the stabilizing mixture of my invention may be incorporated into a plastic composition, i.e., styrene-acrylonitrile copolymer or ABS polymer, which plastic also contains a conventional stabilizer. When such conventional antioxidant is present in the plastic composition, then either zinc sulfide alone or a $\beta,\beta'$-thiodipropionate ester alone will exert some stabilizing action on the plastic composition. However, when zinc sulfide and a $\beta,\beta'$-thiodipropionate ester are combined together, there results a synergistic action; that is, the resultant stabilizing action is considerably greater than that which normally would be expected on the basis of the stabilizing action imparted by the zinc sulfide (alone) or that of the $\beta,\beta'$-thiodipropionate ester (alone).

By the expression "conventional stabilizer" is meant such stabilizers as organic phosphites, organic phenolics, organic amines, and the like. Typical phosphite stabilizers include tris (mixed nonyl phenyl) phosphite, triphenyl phosphite, trioctyl phosphite, tri (4-methyl-2,6-ditertiary butyl phenyl) phosphite, phenyl di (octyl phenyl) phosphite, octyl di (octyl phenyl) phosphite, tri [4-methyl-2,6-di ($\alpha$-methyl-benzyl)] phosphite, etc. Typical phenolic stabilizers include 2,4-methylene bis (4-methyl-6-nonyl phenol), 2,6-ditertiary butyl-p-cresol, 4-methyl-2,6-ditertiary butyl phenol, 4-methyl-2-nonyl phenol, 2,2'-methylene bis (4-methyl-6-tertiary butyl phenol, 2,6-di ($\alpha$-methyl benzyl)-4-cresol, etc. Typical amines include p,p'-dioctyl diphenyl amine, diheptyl diphenyl amine, styrenated diphenyl amine, dinonyl diphenyl amine, N,N'-diphenyl-p-phenylene diamine, N,N'-dioctyl-p-phenylene diamine, N-isopropyl-N'-phenyl-p-phenylene diamine, N-phenyl-N-$\beta$-naphthyl-p-phenylene diamine, etc.

Generally, it is preferred that if a conventional stabilizer is employed along with the stabilizer mixture of my invention, the amount of such conventional stabilizer be from about 0.1 to 5 parts per 100 parts by weight of plastic.

By heat stability I mean the ability of the plastic composition to withstand temperatures in excess of about 300° F., in the presence of air without developing characteristic brown or gray-brown discolorations.

The following examples will further illustrate my invention. All parts are by weight unless otherwise indicated:

PREPARATION OF GRAFT COPOLYMER

A graft copolymer of 32 parts of styrene and 18.4 parts of acrylonitrile polymerized on 49.6 parts of polybutadiene rubber was prepared, using the following recipe:

Ingredients: Parts
Water ------------------------------------ 250
Polybutadiene latex (emulsified with soap and catalyzed with potassium persulfate; parts expressed on the basis of actual rubber solids) -- 49.6
Styrene ---------------------------------- 32
Acrylonitrile ---------------------------- 18.4
Tertiary octyl mercaptan ----------------- 0.3
Potassium persulfate --------------------- 0.43

The above graft copolymer will be referred to hereinafter as Graft "G."

PREPARATION OF MIXTURES OF RESIN (R) AND GRAFT COPOLYMER (G)

The following materials were blended as latices, then coagulated with 1% acetic acid at a temperature in excess of 80° C., filtered, reslurried in water to remove water-soluble components, again filtered, and then dried at temperatures in excess of 60° C. The resultant Resin-Graft mixtures are identified as R-G, R-G-I and R-G-II. It will be noted that R-G contains no conventional stabilizer, whereas both R-G-I and R-G-II do contain a mixture of conventional stabilizers.

| Ingredients | R-G | R-G-I | R-G-II |
|---|---|---|---|
| Graft G | 65 | 65 | 35 |
| 72% styrene-28% acrylonitrile copolymer | 35 | 35 | 65 |
| Antioxidants (emulsified): | | | |
| Alkylated aryl phosphite ("Polygard") | | 3.0 | 3.0 |
| Alkylated phenol ("Naugawhite") | | 0.125 | 0.125 |

The foregoing graft-resin mixtures are also tabulated in terms of amounts of polybutadiene (from the Graft G) and styrene-acrylonitrile resin (including styrene and acrylonitrile from both the Graft G and from the Resin R) as follows:

| Ingredients | R-G | R-G-I | R-G-II |
|---|---|---|---|
| Polybutadiene | 32.5 | 32.5 | 17.5 |
| Styrene-Acrylonitrile Resin | 67.5 | 67.5 | 82.5 |
| Alkylated aryl phosphite | | 3.0 | 3.0 |
| Alkylated phenol | | 0.125 | 0.125 |

INCORPORATION OF STABILIZING MIXTURE

The incorporation of the stabilizing mixture is carried out by any one of several methods:

A. *Mill blending.*—Appropriate amounts of the plastic, i.e., ABS polymer or styrene-acrylonitrile copolymer, along with zinc sulfide, $\beta,\beta'$-thiodipropionate and such other ingredients as lubricants, pigments, and the like are fluxed on a standard two roll rubber mill with the rolls maintained at a temperature of from about 320 to 350° F. After mixing for about 10 minutes the material is removed from the mill as a sheet.

350° F. Eighteen different samples were prepared, each of which contained 100 parts of Resin-Graft-Mixture I (R-G-I) and varying amounts of the stabilizing mixture of my invention.

| Stabilizer | Amount of Stabilizer per 100 parts of R-G-I | | | | | | | | | | | | | | | | | |
|---|---|---|---|---|---|---|---|---|---|---|---|---|---|---|---|---|---|---|
| | A | B | C | D | E | F | G | H | J | K | L | M | N | O | P | Q | R |
| Dilauryl thiodipropionate | 0 | 0.5 | 1.0 | 0 | 0 | 0.5 | 1.0 | 0.5 | 1.0 | 0.3 | 0.5 | 0.7 | 0.5 | 0.7 | 0.3 | 0.7 | 0.5 |
| Zinc sulfide | 0 | 0 | 0 | 0.5 | 1.0 | 0.5 | 0.5 | 1.0 | 1.0 | 1.0 | 0.6 | 0.9 | 0.6 | 0.6 | 0.9 | 0.9 | 1.2 |
| Discoloration rating | 1 | 2 | 2 | 5 | 6 | 10 | 10 | 10 | 10 | 10 | 10 | 11 | 12 | 9 | 9 | 9 | 10 | 10 |

B. *Banbury mixing.*—The plastic, zinc sulfide, β,β'-thiodipropionate, lubricants, pigments, and the like are charged to a Banbury mixer and are mixed for from about three to ten minutes at a temperature of from about 350 to 450° F. The stock is then dumped onto a hot mill and is then removed as a sheet.

C. *Dispersion.*—A dispersion of the zinc sulfide and β,β'-thiodipropionate is added to a latex blend prior to coagulation.

*Example 1*

This example illustrates the efficacy of the stabilizing mixture of my invention as compared to an unstabilized control. An arbitrary scale of discoloration was established, with 13 being indicative of the least discoloration and 1 being indicative of the greatest discoloration. Three separate mixtures were prepared. The first mixture (A) consisted of 100 parts of Resin-Graft mixture R-G (containing 65 parts of Graft G and 35 parts of 72% styrene-28% acrylonitrile copolymer), 0.25 part dilauryl thiodipropionate, and 0.25 part zinc sulfide. The second mixture (B) consisted of 100 parts of Resin-Graft mixture R-G, 0.5 part dilauryl thiodipropionate, and 0.25 part zinc sulfide. The third mixture (C) consisted of R-G-I (65 parts of Graft G, 35 parts of 72% styrene-28% acrylonitrile copolymer, 3.0 parts of "Polygard," and 0.125 part of "Naugawhite"). Each such mixture was charged to a Waring Blendor and mixed for five to ten minutes. The mixture was then pressed into a test sheet using a press maintained at 350° F. One half inch square test pieces were cut from the sheet. The test pieces were oven aged at 350° F. in a circulating air oven for six hours. The results are tabulated below:

DISCOLORATION RATING

| A | B | C |
|---|---|---|
| 8 | 8 | 7 |

It will be seen from the foregoing that the stabilizing mixture of my invention results in an improved discoloration rating (8) as compared to that rating (7) obtained using a mixture of conventional stabilizers. (A completely unstabilized "control" consisting solely of Resin-Graft mixture R-G, when subjected to the same conditions, turned jet black and carbonized in from five to ten minutes, i.e., discoloration rating <1.)

Equivalent results are obtained when one substitutes, for 100 parts of the resin-graft mixture, 100 parts of the copolymer resin R (72% styrene-28% acrylonitrile copolymer). Moreover, when one substitutes for 100 parts of the resin-graft mixture, 100 parts of a physical blend of rubber and resin, e.g., as taught in Daly Patent 2,439,202, similar results are obtained.

In the following examples, using one of the resin-graft mixtures as previously described, the efficacy of the stabilizing mixture of my invention is demonstrated. However, a conventional stabilizer is also present.

*Example 2*

This example illustrates the synergism when zinc sulfide is combined with a dialkyl thiodipropionate ester. In this example the procedure of Example 1 was utilized, however, the aging was carried out for 10.5 hours at 350° F. Eighteen different samples were prepared, each of which contained 100 parts of Resin-Graft-Mixture I (R-G-I) and varying amounts of the stabilizing mixture of my invention.

From the foregoing, the synergism resulting from a combination of dilauryl thiodipropionate and zinc sulfide is clearly evident. Thus, where neither the sulfide nor the thiodipropionate is present, as in Example A, the discoloration rating is 1. The presence of thiodipropionate, as in Examples B and C, results in a discoloration rating of only 2. The presence of zinc sulfide, as in Examples D and E, results in a discoloration rating of 5 or 6. When the discolored products obtained in Examples B or C were mixed with the discolored products obtained in Examples D and E, the discoloration rating was invariably between 2 and 6. However, when both zinc sulfide and thiodipropionate were present, in all instances the discoloration rating was between 9 and 12, i.e., markedly greater than that which would be expected from a consideration of Examples B, C, D and E.

Similar results are obtained when one substitutes, for the resin-graft mixture R-G-I, 100 parts of the copolymer resin R, in that the synergistic effect obtained by the incorporation of the stabilizing mixture of my invention is again demonstrated.

*Example 3*

This example demonstrates the application of the stabilizing mixture of my invention in stabilizing a different ABS polymer, namely R-G-II, the preparation of which was described previously. The procedure was similar to that described in Example 2. The results both for discoloration ratings and physical properties, are tabulated below:

| | A | B | C |
|---|---|---|---|
| Zinc Sulfide | 0 | 1.2 | 0.9 |
| Dilauryl thiodipropionate | 0 | 0.7 | 0.5 |
| | Discoloration Rating | | |
| Hours at 350° F.: | | | |
| 2 | 11 | 13 | 13 |
| 3 | 10 | 12 | 12 |
| 4 | 8 | 12 | 12 |
| 5 | 5 | 12 | 12 |
| 6 | 3 | 12 | 11 |

When aged at 400° F. for 1 hour the following data was obtained:

| Hours at 400° F. | Rating | | |
|---|---|---|---|
| 1 | 7 | 11 | 10 |

The presence of the stabilizing mixture of my invention does not appreciably affect the physical properties, as shown by the following tabulation:

| Properties | A | B | C |
|---|---|---|---|
| Notched Izod Impact at room temperature (¼ inch bar) | 1.1 | 0.86 | 0.89 |
| Rockwell R Hardness | 111 | 111 | 109 |
| Tensile strength, p.s.i. | 5,360 | 5,140 | 5,420 |

Example 4

This example compares the efficacies of distearyl thiodipropionate, di (tridecyl) thiodipropionate, and dilauryl thiodipropionate (when mixed with zinc sulfide). The procedure was the same as described in Example 2, except that the samples were subjected to severe degradative conditions in that they were aged for three hours at 400° F. The results are tabulated below.

|  | Amount of Stabilizer per 100 Parts of R-G-I | | | |
|---|---|---|---|---|
|  | A | B | C | D |
| Zinc sulfide | 0.5 | 0.5 | 0.5 | -------- |
| Dilauryl thiodipropionate | 0.9 | -------- | -------- | -------- |
| Distearyl thiodipropionate | -------- | 0.9 | -------- | -------- |
| Di(tridecyl) thiodipropionate | -------- | -------- | 0.9 | -------- |
| Discoloration Rating | 4 | 4 | 4 | <1 |

Variations can, of course, be made without departing from the spirit of my invention.

Having thus described my invention, what I desire to secure and claim by Letters Patent is:

1. A plastic composition stabilized against discoloration and thermal degradation, this composition comprising a plastic selected from the group consisting of an acrylonitrile-butadiene-styrene polymeric material and a styrene-acrylonitrile copolymer, and a stabilizing amount of a synergistic mixture of zinc sulfide and a thiodipropionate ester of the formula:

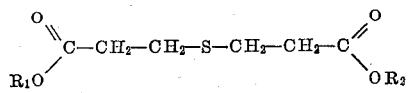

wherein the sum of the carbon atoms in $R_1$ and $R_2$ is at least sixteen and wherein $R_1$ and $R_2$ are selected from the class consisting of (A) alkyl radicals and (B) alkyl radicals linked at $C_1$ carbon atom to the thiodipropionate group and said alkyl radical being substituted with a member of the group consisting of cycloaliphatic and aromatic radicals on the $C_n$ carbon atom wherein $n$ is at least 3.

2. The composition of claim 1 wherein the amount of zinc sulfide is from about 0.01 to 1.5 part per 100 parts of plastic and wherein the weight ratio of thiodipropionate ester to zinc sulfide is from about 0.25:1 to 1.25:1.

3. The composition of claim 2 wherein the weight ratio of thiodipropionate to zinc sulfide is from about 0.5 to 0.8.

4. The composition of claim 1 wherein there is incorporated into said composition from 0.1 to 5 parts by weight of an additional conventional stabilizer for every 100 parts by weight of said plastic.

5. The composition of claim 4 wherein said conventional stabilizer is selected from the group consisting of organic phosphites, organic amines, and organic phenolics.

6. A plastic composition stabilized against discoloration and thermal degradation comprising a plastic selected from the group consisting of an acrylonitrile-butadiene-styrene polymeric material and a styrene-acrylonitrile copolymer, and a stabilizing amount of a synergistic mixture of zinc sulfide and a dialkyl thiodipropionate ester wherein the sum of the carbon atoms of the two alkyl groups is at least 16.

7. A plastic composition stabilized against discoloration and thermal degradation, comprising a plastic selected from the group consisting of an acrylonitrile-butadiene-styrene polymeric material and a styrene-acrylonitrile copolymer, and a stabilizing amount of a synergistic mixture of zinc sulfide and dilauryl thiodipropionate.

8. A plastic composition stabilized against discoloration and thermal degradation, comprising a plastic selected from the group consisting of an acrylonitrile-butadiene-styrene polymeric material a styrene-acrylonitrile copolymer, and a stabilizing amount of a synergistic mixture of zinc sulfide and distearyl thiodipropionate.

9. A plastic composition stabilized against discoloration and thermal degradation, comprising a plastic selected from the group consisting of an acrylonitrile-butadiene-styrene polymeric material and a styrene-acrylonitrile copolymer, and a stabilizing amount of a synergistic mixture of zinc sulfide and di(tridecyl) thiodipropionate.

References Cited by the Examiner
UNITED STATES PATENTS

| 2,519,755 | 8/1950 | Gribbins | 260—45.85 |
| 3,029,224 | 4/1962 | Fischer et al. | 260—45.75 |

LEON J. BERCOVITZ, *Primary Examiner.*

DONALD E. CZAJA, *Examiner.*

G. W. RAUCHFUSS, *Assistant Examiner.*